United States Patent

[11] 3,589,653

| [72] | Inventor | Richard J. Slater<br>Northfield, Minn. |
|---|---|---|
| [21] | Appl. No. | 811,763 |
| [22] | Filed | Apr. 1, 1969 |
| [45] | Patented | June 29, 1971 |
| [73] | Assignee | G. T. Schjeldahl Company<br>Northfield, Minn. |

[54] STRESS-TAILORED GORES
7 Claims, 6 Drawing Figs.

[52] U.S. Cl. ............................................ 244/145,
[51] Int. Cl. .......................................... B64d 17/02
[50] Field of Search ........................................... 244/142,
145, 138, Dig. 1

[56] References Cited
UNITED STATES PATENTS

| 2,745,615 | 5/1956 | Fogal | 244/145 |
| 3,298,640 | 1/1967 | Heinrich | 244/145 |
| 3,331,573 | 7/1967 | Winker et al. | 244/145 |
| 3,428,277 | 2/1969 | Everett, Jr. | 244/142 |
| 3,284,032 | 11/1966 | Eckstrom | 244/145 |

*Primary Examiner*—Milton Buchler
*Assistant Examiner*—James E. Pittenger
*Attorney*—Orrin M. Haugen ABSTRACT: Stress-tailored gores for aerial decelerator devices such as parachutes, paragliders or the like comprising gores in the form of flexible reinforced structures. The gores forming the decelerator structure are made of either nonporous film or a woven porous fabric such as nylon or the like of the type normally employed for aerial decelerator devices. Reinforcing scrim or lines are secured to a surface of the gore structure with certain of the scrim axes being arranged generally oblique to the axis of the gore, and in addition, load lines or additional reinforcement is applied along an axis generally parallel to the axis of the particular segment of the gore at the point where the reinforcement is applied. Load or shroud lines are also provided which extend along the lateral edges of the individual gores with the free ends of these edge-mounted reinforcing lines being secured to a common load ring or load bearing member.

PATENTED JUN29 1971

INVENTOR.
RICHARD J. SLATER
BY
Orrin M. Haugen
ATTORNEY

PATENTED JUN29 1971
3,589,653
SHEET 2 OF 2
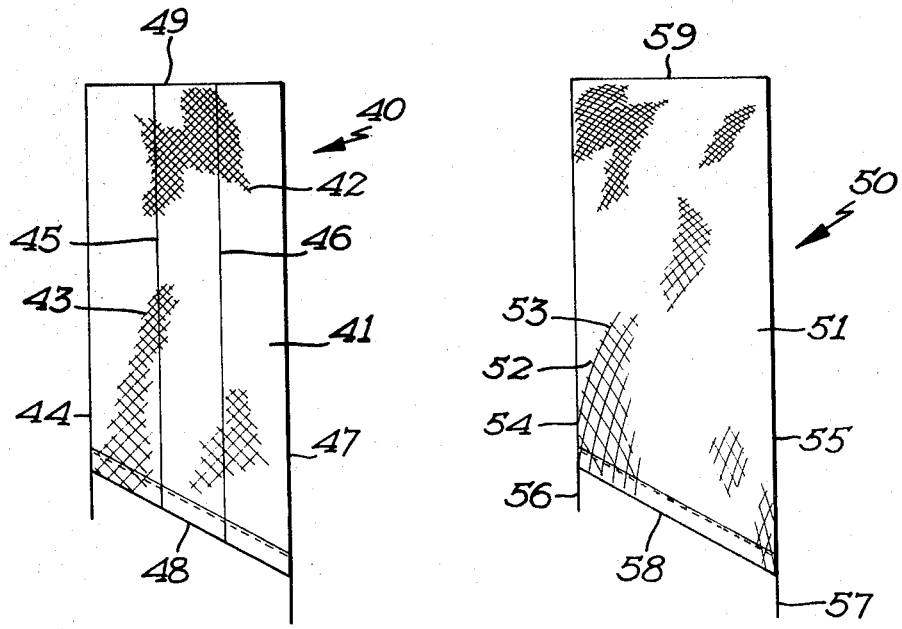
FIG 4
FIG 5
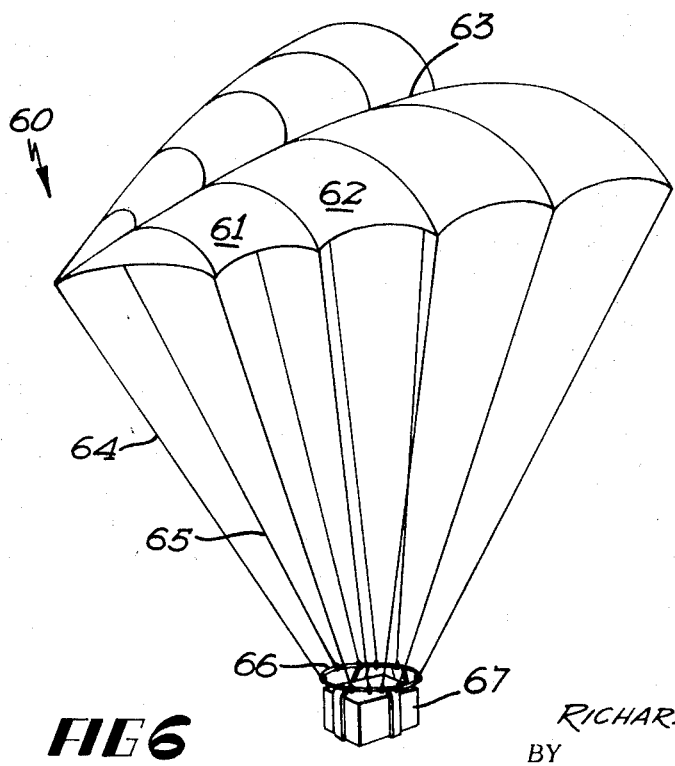
FIG 6
INVENTOR.
RICHARD J. SLATER
BY
Orrin M. Haugen
ATTORNEY

STRESS-TAILORED GORES

The present invention relates generally to an improvement in aerial decelerator devices such as, for example, parachutes, paragliders, or the like, and more specifically to this type of structure which comprises one or more gore elements having reinforcing scrim lines secured to the surface thereof. The structure of the present invention provides an aerial decelerator which is light in weight, has few seams, and which has extremely stable flight or deceleration characteristics and good shock resistance.

In the design and manufacture of aerial decelerator structures, it is generally necessary to provide for controlled passage of air through the structure, for example, the parachute canopy, or through portions thereof, in order to achieve aerodynamic stability. This controlled passage of air in decelerator devices is ordinarily accomplished by using a structure fabricated from air permeable material, or by utilizing cohesive nonporous or nonpermeable films having openings or pores therein to achieve desired air permeability. With the advent of nonporous materials of high strength, including plastic films and the like, which films have been found to possess the strength necessary to withstand the rigors of operation as aerial decelerator devices, certain weight, strength and cost advantages can be gained by the utilization of these films. An example of film material which is commercially available and which has been found to have sufficient strength to be employed in aerial decelerator devices of this type is stress-oriented polyethylene terephthalate, this material being available from E. I. DuPont de Nemours Corp. of Wilmington, Delaware under the name "Mylar." In the structure of the present invention, this film material is reinforced with a suitable scrim, the scrim providing the resistance to tear which is ordinarily deemed desirable, and which is applied to the surface of the film in a fashion so as to provide biaxial strength at the points where strength is required.

The nonporous films are generally available in a variety of film thicknesses, widths and lengths, this availability being limited to extruded forms such as flat sheets for economic reasons. Parachute structures in accordance with the present invention can conveniently be fabricated from flat material, the canopy conforming to the desired configuration upon exposure to a dynamic air stream while being used as a decelerator. The canopy is formed so as to achieve optimum drag, stability and strength along with a minimum of area and a minimum of weight.

Specifically, and in one aspect of the present invention, a parachute canopy or structure consists of a plurality of edge-sealed gores, each gore having an elongated axis, the segments being coupled together along their edges and having a common apex at the center thereof. The individual gores are provided with reinforcing scrim which is formed along a variety of axes, a first material being secured to the surface of the gores, the scrim including material arranged generally obliquely to the axis of the supporting gore, as well as material arranged generally parallel to the axis of the gore. In other words, the scrim is disposed in a substantially biaxial disposition. In addition, load lines are provided for the structure, these load lines being secured to the gore surfaces and being disposed along the edges and generally parallel to the axis of the individual segments. As is essential, these load lines extend beyond the ends of the gore and are secured to a common load member or load ring. It has been found that this structure achieves high strength with minimum weight, and accordingly a high degree of shock resistance.

Therefore, it is an object of the present invention to provide an improved stress-tailored aerial decelerator gore having high strength and low weight.

It is a further object of the present invention to provide an improved material for the fabrication of aerial decelerator gores which provides an optimum relationship between strength, weight, and shock resistance.

Other and further objects of the present invention will become apparent to those skilled in the art upon a study of the following specification, appended claims, and accompanying drawing wherein:

FIG. 4 is a plan view of a stress-tailored gore specifically designed for use in a parawing aerial decelerator, and having a reinforcement pattern similar to that shown in FIG. 1;

FIG. 5 is a plan view of a gore similar to the gore shown in FIG. 4, with a reinforcement pattern similar to that pattern shown in FIG. 2; and FIG. 6 is a perspective view of a deployed parawing structure utilizing the stress-tailored gores of FIGS. 4 and 5.

Figure 1:
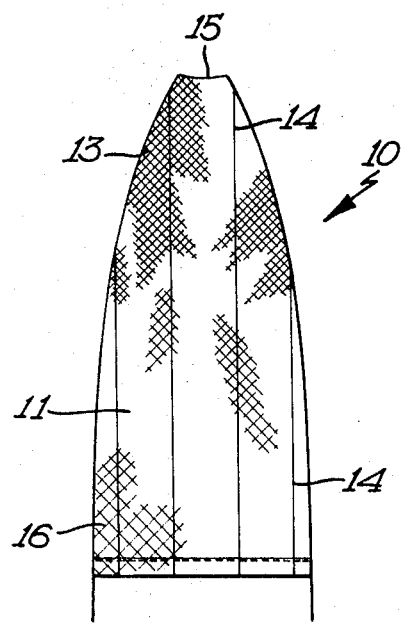
FIG. 1 is a plan view of a gore designed for use in a standard parachute of the hemispherical form, the reinforcement of the gore being disposed in a fashion tailored to the stresses developed during use.

In accordance with the preferred modification, and as particularly shown in FIG. 1, the gore structure generally designated 10 includes a flexible supporting structure or gore base 11 having a pattern or reinforcing applied to the surface thereof, the pattern including reinforcing lines which are disposed oblique to the gore axis, such as the lines 13, and additional reinforcing lines disposed generally parallel to the gore axis such as the lines 14. The area of the gore adjacent the upper portion, such as at 15, is adapted to lie adjacent the central axis of the parachute, and it is this portion which has a dense reinforcing pattern. This dense pattern is necessary because of the stresses developed in the parachute upon deployment, these stresses being at a substantial maximum in this zone or area of the chute. Because of this concentration of stresses in this area, the reinforcing pattern is arranged so as to substantially uniformly distribute the stresses within the reinforcing lines during operation. It will be observed that the reinforcing lines arranged adjacent the outer edge of the parachute gore such as at 16, are arranged in a relatively open pattern of lower density. Thus, the density of the pattern is seen to increase from the portion of the gore adjacent the outer edge to the portion of the gore adjacent the central axis of the parachute or aerial decelerator device.

If desired, the reinforcing lines 14 which are arranged generally parallel to the axis of the gore may be laid in such a way so as to continue integrally up to a point adjacent the edge area 15. This will provide for a concentration of reinforcing materials adjacent this point of the structure and may be utilized if desired.

Figure 2:
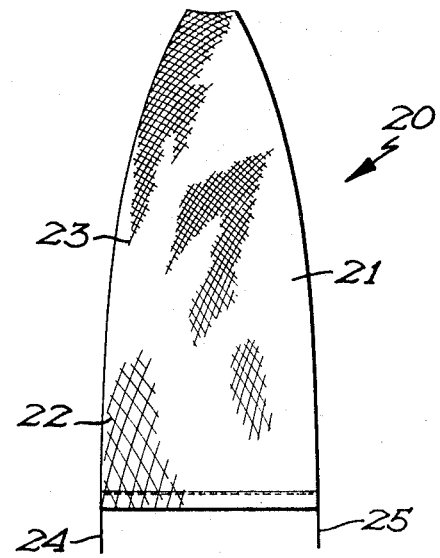
FIG. 2 is a plan view of a gore similar to the gore shown in FIG. 1, with a modified form of reinforcement design.

Turning now to the gore shown in FIG. 2, this gore generally designated 20 includes a flexible supporting structure or gore base 21 along with a plurality of reinforcing lines such as the lines 22 and the lines 23. These individual lines form a composite shroud line as at 24 and as at 25, and are capable of being arranged in this fashion since they pass across the gore surface generally oblique to the gore axis, and reach and extend to the opposite lateral edge. They are gathered together at these lateral edges and formed into a composite shroud line at the gore edge. The shroud lines shown as at 24 and 25 may extend continuously to the load ring area, if this is desired, or may alternatively be coupled or secured to an individual shroud line which can extend from the termination of the lines 24 and 25 on to the load ring.

Figure 3:
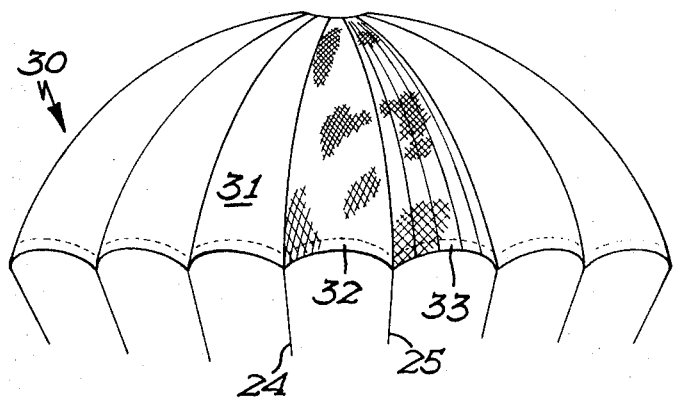
FIG. 3 is an elevational view of a standard parachute of hemispherical configuration utilizing the stress-tailored gores shown in FIGS. 1 and 2.

Turning now to FIG. 3, this figure shows a fully deployed standard parachute structure generally designated 30 which includes a plurality of individual gores such as the gores 31, 32 and 33. It is the purpose of this figure to illustrate the use of the individual gores in an actual parachute environment, and it is appreciated that other types of standard parachutes, such as the flat circular parachutes and the like may be employed with this gore design as well.

In the design of the parachute structure such as the structure 30, it is frequently desirable to have the edges of the gores which form the lateral edges coupled directly to the lateral edge of the next adjacent gore. This bonding area may include, if desired, a plurality of reinforcing lines which, upon extension or continuation, form the shroud lines for the decelerator device. If the gore shown in FIG. 1 is utilized, individual or separate shroud lines should accordingly be employed.

It will be appreciated that the preferred materials of construction for the flexible supporting structure forming the gore base should be a film fabricated as stress-oriented polyethylene terephthalate. This material is extremely strong and resistant to tear, and has been found to function well in this type of structure. The reinforcing lines are preferably lines prepared from polyethylene terephthalate as well, this providing a reasonable match of physical characteristics. The reinforcing lines formed of woven fibers are available commercially under the code name of Dacron from the E. I. DuPont de Nemours Corp. of Wilmington, Delaware. The lines of reinforcing material may be secured to the surface of the film forming the gore by either standard adhesive techniques or other bonding methods. The bonding method employed should be such that a sound bond is obtained between the gore base and the reinforcing lines so as to eliminate dangers of massive tearing or rupturing of the gore surface.

Turning now to FIG. 4 of the drawings, the gore generally designated 40 is destined for use in a standard parawing device. The gore 40 has a flexible supporting film base 41 together with reinforcing lines 42 and 43 which extend generally obliquely to the axis of the gore, and lines 44, 45, 46, and 47 which are arranged generally parallel to the gore axis. Lines 44 and 47 preferably extend from the outer edge surface 48 of the gore 40 so as to form shroud lines, while reinforcing lines 45 and 46 will generally terminate at the edge 48. The density of the pattern is preferably greater at the area toward the central axis of the parawing, such as is seen at 49. The reason for providing this additional reinforcing is to tailor the structure to the stresses encountered during normal operation. The materials of construction for the gore 40 are the same as those mentioned in connection with the structures of FIGS. 1 and 2.

Turning now to FIG. 5, a gore 50 is shown having a flexible supporting film structure 51 along with reinforcing lines such as the lines 52 and 53. The lines 52 and 53 span obliquely across the central gore axis and are preferably gathered at a point adjacent the lateral edges of the gore such as at and along the edges 54 and 55 so as to form, in continuation, the shroud lines 56 and 57. The density of the reinforcing pattern formed by the lines 52 and 53 increases from the outer edge 58 toward the inner edge or central axis edge 59 of the gore 50. It is the area adjacent the edge 59 which lies along the central axis of the parawing decelerator device and which accordingly is subjected to the maximum amount of stress during use.

Turning now to FIG. 6, a parawing generally designated 60 is shown employing a plurality of individual gores such as the gores 61 and 62. These gores are similar to those shown in FIGS. 4 and 5, and are secured together along a common central axis, such as is shown at 63. The individual shroud lines 64, 65, and the like extend from the outer edges of the individual gores to a common load ring as at 66, the load ring 66 supporting the load 67.

While it has been stated that the parawing structure of the present invention is preferably fabricated from stress-oriented polyethylene terephthalate, it will be appreciated that other flexible supporting structures or films may be employed, the physical characteristics required being that of high strength and low or minimum weight. This provides a greater degree of load carrying capability, as is desirable in all aerial decelerators. It will be appreciated that woven fabrics such as nylon or the like may be employed as the flexible supporting structure of the gore, and this flexible supporting structure, when woven from nylon filaments, may be provided with reinforcing lines secured to the surface of the gore. The reinforcing arrangement enhances the strength and minimizes the weight on this structure as well. In addition, it is no longer necessary to limit the arrangement of the filament direction, since the strength is achieved by virtue of the reinforcing material, and not in the base material as is true in conventional parachutes. The gore may be fabricated from one piece of woven material whereas in a standard parachute, the gore is ordinarily fabricated by sewing a number of sections together on a bias, or along a line generally oblique to the axis of the gore.

It has been indicated that film materials are preferred. It is pointed out here that the thread laid scrim materials of the present invention provide at least 60 percent more strength than conventionally woven materials. The result is a substantially higher strength to weight ratio. In addition, the substrate may be fabricated from lighter and thinner materials of construction, thus providing an advantage over the woven material of similar strength.

It will be appreciated that other materials of construction may be employed, and various other reinforcing patterns may be employed which will relate to the structures shown herein, and which will provide a density of reinforcing lines which are arranged in a pattern so as to match or substantially match the stresses experienced during operation.

I claim:

1. Aerial decelerator means having a central axis, and comprising a plurality of gore structures, the gore structures comprising:
   a. a flexible nonporous coherent film supporting structure forming a gore base with a first portion adapted to lie adjacent said central axis and with another portion adapted to lie adjacent an outer edge of said aerial decelerator;
   b. reinforcing line means secured to the surface of said gore base;
   c. said reinforcing line means being arranged in a pattern along the surface of said gore base, the density of the pattern continuously increasing from the portion adjacent the gore edge to the portion adjacent the central axis of the aerial decelerator, the density pattern generally matching the operational stresses within said gore during operation so as to provide substantially uniform distribution of stresses within the reinforcing line means.

2. The aerial decelerator device as defined in claim 1 being particularly characterized in that said coherent film is stress-oriented polyethylene terephthalate.

3. The aerial decelerator device as defined in claim 1 being particularly characterized in that reinforcing lines are gathered along a first lateral gore edge to form a first composite shroud line with individual lines extending generally obliquely to the gore axis across the gore toward the opposite lateral gore edge where they are gathered together and arranged along said opposite lateral gore edge to extend in a direction toward said gore portion lying adjacent the outer edge of the aerial decelerator to form a second composite shroud line.

4. The aerial decelerator device as defined in claim 1 being particularly characterized in that the rate of increase in density of the pattern of reinforcing lines is uniform from the edge portion of the gore to the portion adjacent the central axis of the aerial decelerator.

5. The aerial decelerator device as defined in claim 1 being particularly characterized in that said flexible supporting structure consists essentially of stress-oriented polyethylene terephthalate film, and said reinforcing lines consist essentially of polyethylene terephthalate filaments.

6. Aerial decelerator means having a central axis, and comprising a plurality of gore structures, the gore structures comprising:
   a. flexible supporting structure forming a gore base with a portion adapted to lie adjacent said central axis and with another portion adapted to lie adjacent an outer edge of said aerial decelerator;

b. reinforcing line means secured to the surface of said gore base;
c. said reinforcing line means being arranged in a pattern along the surface of said gore base, the density of the pattern increasing from the portion adjacent the gore edge to the portion adjacent the central axis of the aerial decelerator, the density pattern generally matching the operational stresses within said gore so as to provide substantially uniform distribution of stresses within the reinforcing line means;
d. said gore being substantially in the form of a segment of a circuit with a gore axis, and with first reinforcing lines being disposed generally oblique to the gore axis, and with second reinforcing lines being disposed generally parallel to the gore axis, the obliquely disposed reinforcing lines having a variable density pattern.

7. The aerial decelerator device as defined in claim 8 being particularly characterized in that said flexible supporting structure consists essentially of stress-oriented polyethylene terephthalate film, and said reinforcing lines consist essentially of polyethylene terephthalate filaments.

UNITED STATES PATENT OFFICE
CERTIFICATE OF CORRECTION

Patent No. 3,589,653          Dated June 29, 1971

Inventor(s) Richard J. Slater

It is certified that error appears in the above-identified patent and that said Letters Patent are hereby corrected as shown below:

Column 3, line 22, after the word "gore" insert -- base --.

Column 6, Claim 6, line 1, "circuit" should read -- circle --.

Signed and sealed this 2nd day of November 1971.

(SEAL)
Attest:

EDWARD M. FLETCHER, JR.          ROBERT GOTTSCHALK
Attesting Officer                Acting Commissioner of Patents